(12) United States Patent
Etaati

(10) Patent No.: US 8,793,538 B2
(45) Date of Patent: Jul. 29, 2014

(54) SYSTEM ERROR RESPONSE

(75) Inventor: Sahba Etaati, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 347 days.

(21) Appl. No.: 13/361,102

(22) Filed: Jan. 30, 2012

(65) Prior Publication Data

US 2013/0198575 A1 Aug. 1, 2013

(51) Int. Cl.
*G06F 11/273* (2006.01)

(52) U.S. Cl.
USPC .............................................. 714/45; 714/56

(58) Field of Classification Search
CPC ............ G06F 11/0766; G06F 11/0778; G06F 11/0787; G06F 11/3476; G06F 11/364
USPC ...................................... 714/45, 56
See application file for complete search history.

(56) References Cited

U.S. PATENT DOCUMENTS

| 4,598,364 | A | * | 7/1986 | Gum et al. | 714/38.13 |
|---|---|---|---|---|---|
| 5,490,250 | A | * | 2/1996 | Reschke et al. | 714/49 |
| 2002/0162055 | A1 | * | 10/2002 | Kurooka et al. | 714/45 |
| 2004/0139269 | A1 | * | 7/2004 | Nakamura | 710/310 |
| 2004/0221198 | A1 | * | 11/2004 | Vecoven | 714/25 |
| 2005/0081127 | A1 | * | 4/2005 | Rowlands et al. | 714/56 |
| 2005/0268187 | A1 | | 12/2005 | Patrick et al. | |
| 2006/0236209 | A1 | * | 10/2006 | Aida et al. | 714/768 |
| 2007/0240019 | A1 | * | 10/2007 | Brady et al. | 714/43 |
| 2009/0106594 | A1 | | 4/2009 | Zhang et al. | |
| 2009/0300452 | A1 | * | 12/2009 | Ichimiya et al. | 714/748 |
| 2011/0219270 | A1 | | 9/2011 | Bouda | |
| 2011/0264960 | A1 | * | 10/2011 | Cho | 714/37 |
| 2012/0144245 | A1 | * | 6/2012 | Fan et al. | 714/43 |

FOREIGN PATENT DOCUMENTS

EP 2336889 A1 6/2011

OTHER PUBLICATIONS

"Restore From Hibernate Fails From Time to Time"; May 9, 2011; http://forums.debian.net/viewtopic.php?f=5&t=63429.
"Save Data Into NVRAM When Power Failure"; Digit, Making Wireless M2M Easy; Mar. 10, 2011; 2 pages.
Chen S., et al.; "Log-based Architectures: Using Multi-core to Help Software Behave Correctly"; vol. 45; Issue 1; Jan. 2011; pp. 84-91.
Sharma, R.R.; "Effect of Hardware Noise and Fault Injection on Performance and Resilience in an MPI Based FPGA Cluster"; 2009.
"Mcelog"; retrieved on Jan. 24, 2012; http://mcelog.org/index.html.

* cited by examiner

*Primary Examiner* — Chae Ko
(74) *Attorney, Agent, or Firm* — Aamir Haq

(57) ABSTRACT

An example system includes a bus, a logic device, a controller, and a non-volatile memory. The bus is configured to propagate data including at least system console output data. The logic device is configured to monitor the data on the bus and to store the system console output data in a buffer. The controller is configured to detect a system error, and, in response to the system error, to acquire at least a portion of the system console output data from the buffer. The non-volatile memory is configured to store the portion of the system console output data acquired by the controller.

20 Claims, 6 Drawing Sheets

SYSTEM ERROR RESPONSE

BACKGROUND

System errors are quite common in computer-based systems. Such errors can typically be classified into two categories: non-fatal system errors and fatal system errors. For non-fatal system errors (e.g., an application failure), the operating system continues to operate notwithstanding the error. On the other hand, for fatal system errors (e.g., a kernel error), the operating system does not continue operating because it has encountered a critical, non-recoverable error that is causing the operating system to shut down.

BRIEF DESCRIPTION OF THE DRAWINGS

Example embodiments are described in the following detailed description and in reference to the drawings, in which.

DETAILED DESCRIPTION

Figure 1:
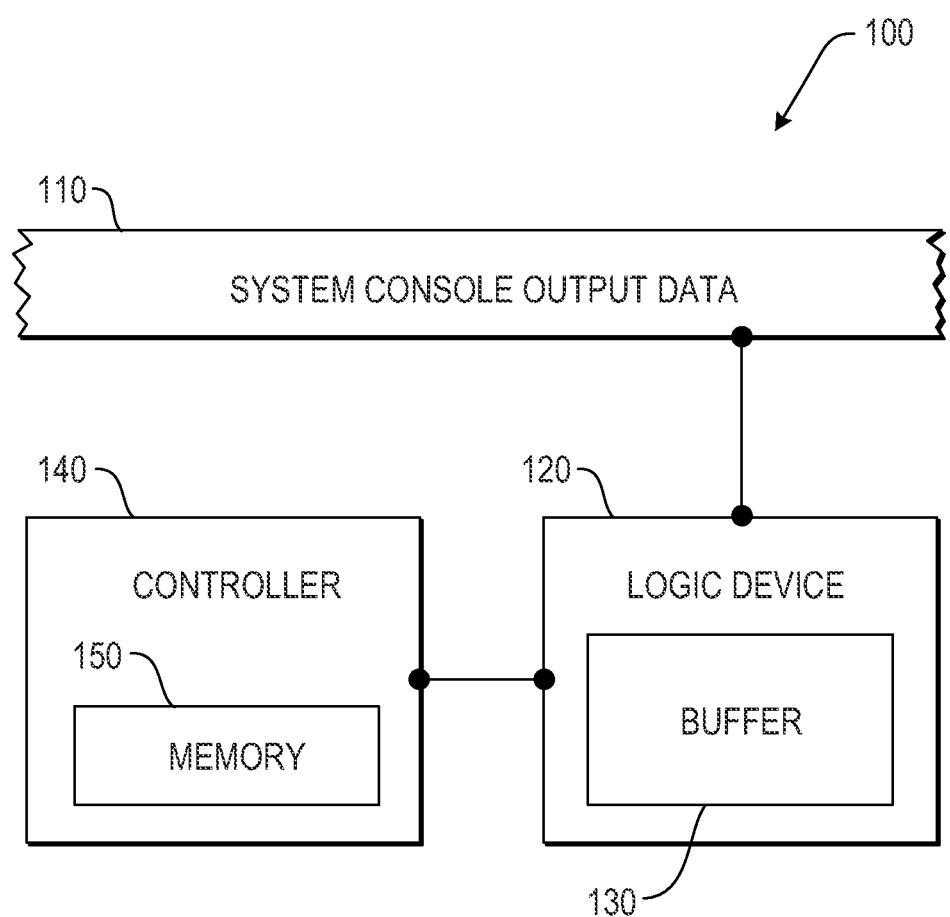
FIG. 1 depicts a system in accordance with an embodiment.

Various embodiments described herein are directed to a novel and previously unforeseen approach to capturing recent system information just prior to or at the time of a fatal system error, and making such system information accessible for post-failure analysis. As discussed in detail below, these embodiments allow error information that was previously unavailable in current systems to be collected and made accessible in an efficient and effective manner. Moreover, these embodiments allow large amounts of component status information to be collected and made accessible in an efficient and effective manner.

Current systems handle non-fatal system errors by detecting the error and logging information about the error in a log for potential post-failure analysis. The system is able to conduct this function because the operating system is not shutting down as a result of the error (i.e., the error is not fatal). By contrast, in response to fatal system error (also known as a system crash, stop error, kernel error, hardware error, and/or machine check error), the system is on the verge of shutting down, and therefore does not log or otherwise store information about the error for post-failure analysis. At best, the system may output error information to the system console, but this information is not saved and is only helpful if a system administrator is logged into the system console and is reviewing the information prior to the system shutting down. Thus, for systems in the field where the system console output is typically not connected and/or monitored because the system administrator manages the system via a network-based (e.g., Ethernet) management interface, it is difficult if not impossible to efficiently access and analyze highly relevant system information related to system activity and system administration processes occurring proximate to when the fatal system error occurred.

Embodiments of the present disclosure address at least the above by rapidly collecting and making accessible a vast amount of system information notwithstanding a fatal system error event. Such information may be promptly collected moments before the system shuts down, and therefore provides a highly useful glimpse as to the state of the system around the time of the fatal system error and just prior to the system shutting down.

In one example embodiment, a system is provided. The system comprises a bus, a logic device, a controller, and a non-volatile memory. The bus is configured to propagate data comprising at least system console output data. The logic device is configured to monitor the data on the bus and to store the system console output data in a log buffer. The controller is configured to detect a system error, and, in response to the system error, to acquire at least the most recent portion of the system console output data from the log buffer. The non-volatile memory is configured to store the portion of the system console output data acquired by the controller.

In a further embodiment, another system is provided. The system comprises a bus, a logic device, a controller, and a non-volatile memory. The logic device is configured to receive a status signal from a plurality of system components. The register is configured to store information indicating whether a status of at least one of the plurality of system components changed. The controller is configured to detect a system error, and, in response to the system error, to acquire the information indicating whether the status of at least one of the plurality of system components changed from the register. The non-volatile memory is configured to store the information indicating whether the status of at least one of the plurality of system components changed.

In an additional embodiment, a further system is provided. The system comprises a logic device and a controller. The logic device is configured to monitor data on a bus and store system console output data in a buffer, and to receive a status signal from a plurality of system components and store information in a register indicating whether a status of at least one of the plurality of system components changed. The controller is configured to detect a system error, and, in response to the system error, acquire at least a portion of the system console output data from the buffer, and to acquire the information indicating whether the status of at least one of the plurality of system components changed from the register.

FIG. 1 depicts a system 100 in accordance with an embodiment. The system 100 may be a computer-based system such as, for example, a server, a switch, or a storage device. The system 100 comprises a bus 110, a logic device 120, a buffer 130, a controller 140, and a memory 150. It should be readily apparent that the system 100 depicted in FIG. 1 represents a generalized illustration and that other elements may be added or existing elements may be removed, modified, or rearranged without departing from the scope of the present disclosure.

The bus 110 is configured to propagate data within the system 100. The bus 110 may be parallel bus, a serial bus, a local bus, a unidirectional bus, a bidirectional bus, a dedicated bus, and/or a shared bus. Moreover, the bus 110 may comprise multiple buses. Regardless of the type of bus, the bus 110 propagates at least system console output data. Such system console output data may include system administration data from, e.g., the BIOS output, the boot loader, the kernel, the drivers, the firmware, the initialization system, the error monitoring and handling modules, and/or the system logger.

The logic device 120 is coupled to the bus 110. The logic device 120 may be a fixed or programmable logic device that is configured to perform functions in response to an input. For example, the logic device 130 may be a programmable logic device (PLD) such as a complex programmable logic device (CPLD), field programmable logic device (FPGA), programmable logic array (PLA), programmable array logic (PAL), or generic array logic (GAL). The logic device 120 is configured to monitor or "snoop" the data propagating on the bus 110. More precisely, the logic device 120 is configured to monitor or "snoop" the data on the bus 110 and collect any system console output data passing on the bus and store this data in an internal buffer 130. This process may be accomplished, for example, by the logic device 120 inspecting the packets on the bus for a standard address associated with the system console output and saving such packets in the buffer 130.

The buffer 130 may be a rotating log configured to store recent system console output data obtained by the logic device 120. For example, the buffer 130 may be configured to rotate 4K-32 KB of received system console output data such that at any point the buffer comprises the most recent 4K-32 KB of system console output data that was traveling on the bus 110.

The controller 140 is communicatively coupled to the logic device 120. The controller 140 may be a board management controller (BMC) that is part of the intelligent platform management interface (IPMI). The controller 140 may be embedded on the motherboard of the system 100. The controller 140 may manage the interface between system management software and platform hardware, monitor the physical state of the system 100 via sensors, and/or communicate with system administration. Furthermore, the controller 140 may be configured to detect a system error and, in response to the system error, to rapidly acquire at least a portion of the system console output data from the buffer 130. More precisely, the controller 140 may communicate and/or have heartbeat signaling with system components such as the central processing unit (CPU) and utilize this communication to determine when system errors occur. In some implementations, the controller 140 may receive an interrupt when a non-fatal or fatal system error occurs. In response to a determination that a fatal system error has occurred, the controller 140 may promptly acquire the current system console output data stored in the buffer 130 within the logic device 120. The controller 140 may then promptly store the acquired system console output data in the memory 150. The process of acquiring the data from the buffer 130 and storing the data in memory may occur, e.g., in under 2 mS, because the system (e.g., a server) is failing and the data must be acquired and stored in a rapid manner.

The memory 150 utilized to store the data obtained by the controller 140 may be a non-volatile memory (e.g., ROM, flash memory, NVRAM, magnetic storage, MRAM, EEPROM, etc.), so that the data stored may be recovered at a later point for post-failure analysis. In some implementations, the memory 150 may be integrated with the controller 140, while in other implementations the memory 150 may be a discrete component separate from the controller 140.

Figure 2:
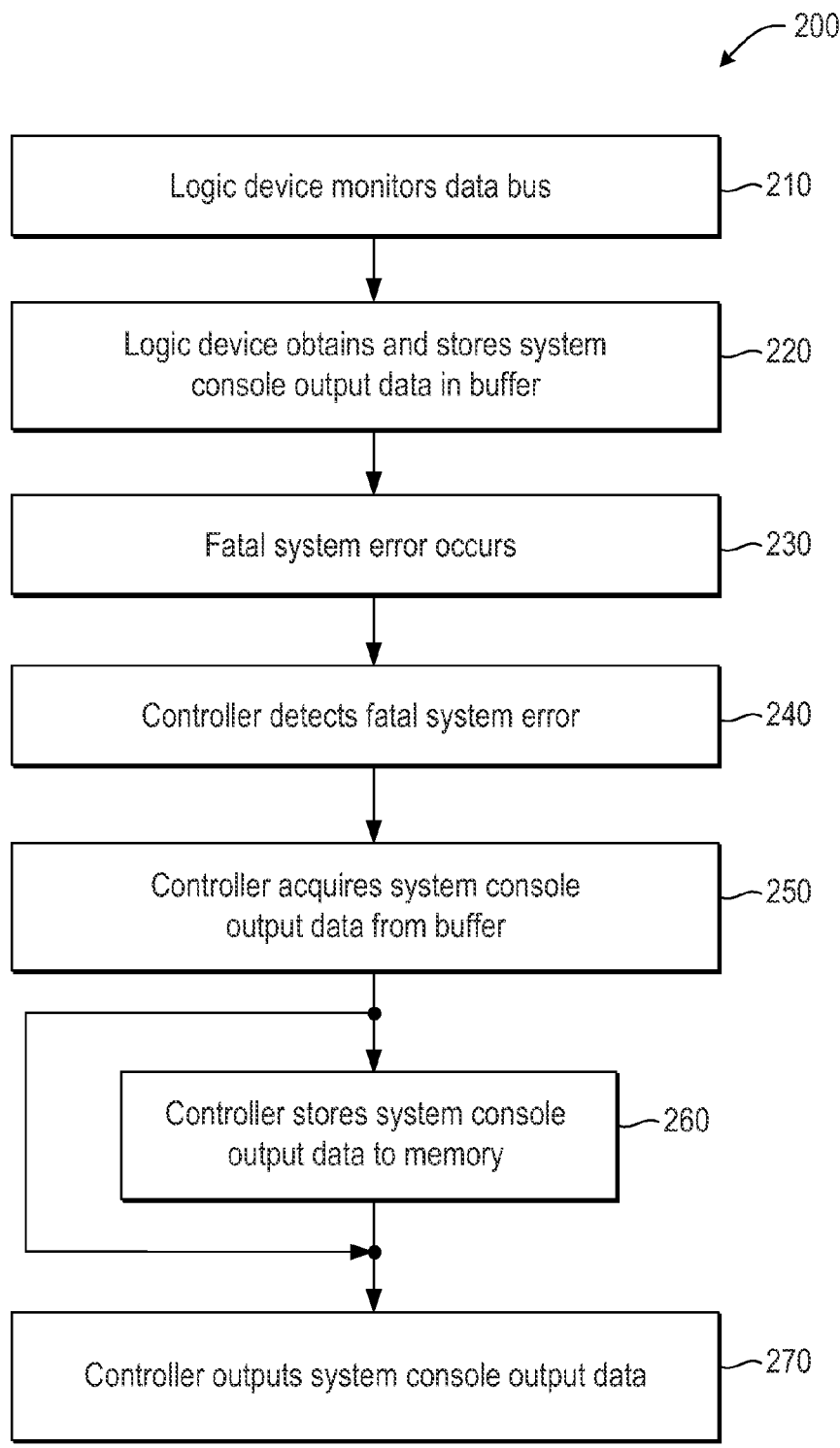
FIG. 2 depicts a process flow diagram in accordance with an embodiment.

FIG. 2 depicts a process flow diagram 200 in accordance with an embodiment. It should be readily apparent that the processes depicted in FIG. 2 (as well as FIGS. 4 and 6) represent generalized illustrations, and that other processes may be added or existing processes may be removed, modified, or rearranged without departing from the scope and spirit of the present disclosure. Further, it should be understood that the processes may represent executable instructions that may cause the logic device 120 and/or controller 140 to respond, to perform actions, to change states, and/or to make decisions. Thus, the described processes may be implemented as processor executable instructions and/or operations provided by a computer-readable medium associated with the logic device 120 and/or controller 140. Moreover, the processes may represent functions and/or actions performed by functionally equivalent circuits like an analog circuit, a digital signal processor circuit, an application specific integrated circuit (ASIC), or other logic devices associated with the logic device 120 and/or controller 140. FIG. 2 is not intended to limit the implementation of the described embodiments, but rather the figure illustrates functional information one skilled in the art could use to design/fabricate circuits, generate software, or use a combination of hardware and software to perform the illustrated processes.

The process may begin at block 210, where the logic device 120 monitors or "snoops" the data on a bus 110. In particular, the logic device 120 may evaluate the data traveling on the bus 110 to determine which data is system console output data. This may be accomplished by comparing the address associated with data on the bus against a known system console output address to identify system console output data. At block 220, the logic device 120 may obtain and store any system console output data traveling on the bus 110 to a buffer 130. As mentioned above, the buffer 130 may be a rotating log configured to store the recent system console output data obtained by the logic device 120. For example, the buffer 130 may be configured to rotate 4K-32 KB of received system console output data, such that at any point, the buffer comprises the most recent 4K-32 KB of system console output data. Thereafter, in response to a fatal system error occurring at block 230, and the fatal system error being detected by the controller 140 at block 240, the controller 140 may acquire the system console output data currently stored in the buffer at block 250. The controller 140 may then, at block 260, store the system console output data to memory 150 and/or at block 270 output the system console output data. The controller 140 may output the system console output data to, for example, other components in the system 100, or to other components or devices attached to the system 100. In some embodiments, the controller may output the system console output data to other controllers (e.g., other board management controllers in a cluster). In other embodiments, the controller 140 simply stores the system console output data to memory and does not proceed to output the data.

Figure 3:
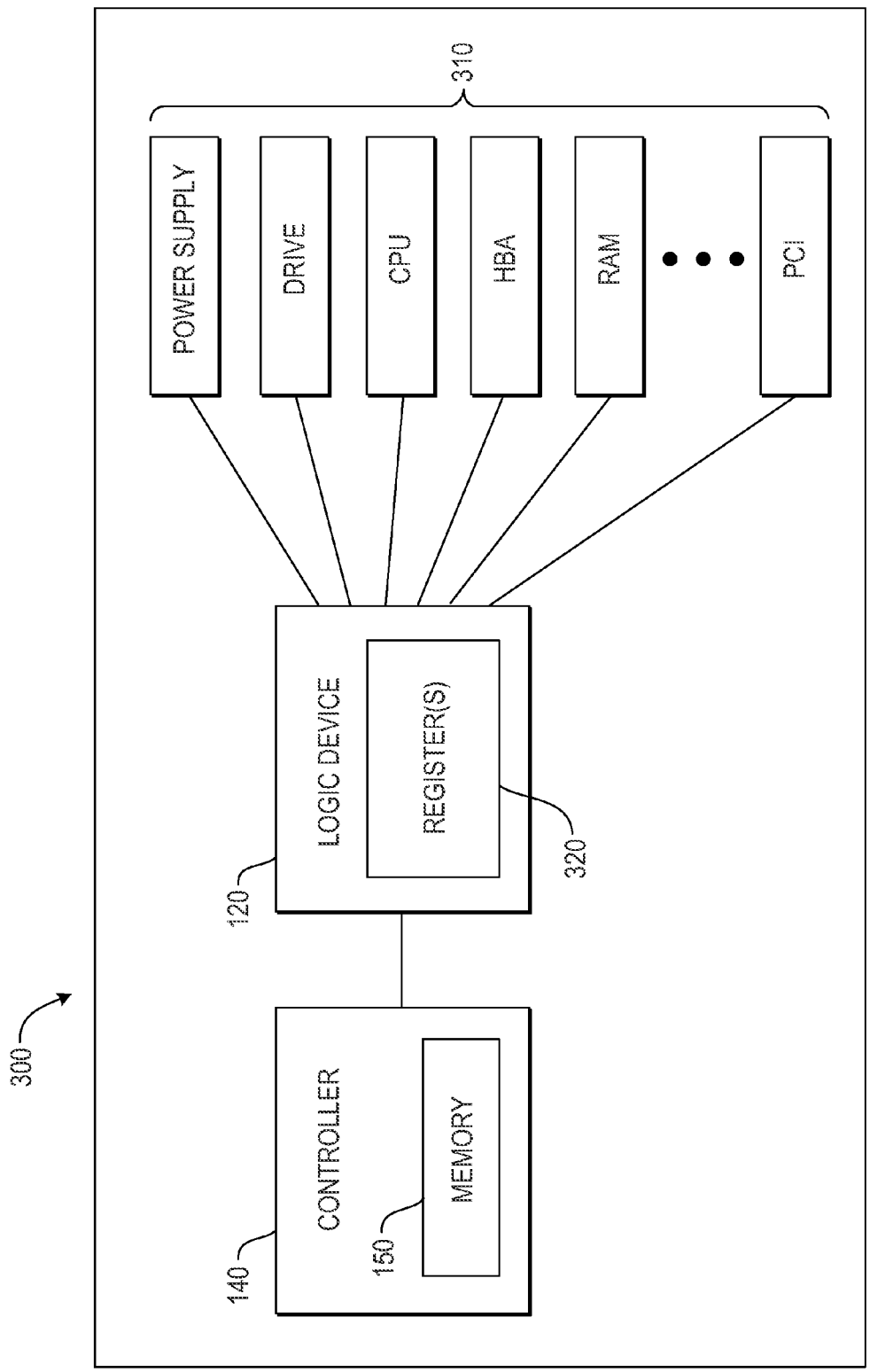
FIG. 3 depicts a system in accordance with another embodiment.

FIG. 3 depicts a system 300 in accordance with another embodiment. It should be readily apparent that the system 300 depicted in FIG. 3 represents a generalized illustration and that other elements may be added or existing elements may be removed, modified, or rearranged without departing from the scope of the present disclosure.

Similar to FIG. 1, the system 300 in FIG. 3 is a computer-based system such as, for example, a server, a switch, or a storage device. In addition, the system 300 comprises a logic device 120, a controller 140, and a memory 150, as described above with respect to FIG. 1. The system 300, however, further comprises a plurality of system components 310 (e.g., a power supply, drive, central processing unit (CPU), host bus adapter (HBA), random access memory (RAM), peripheral component interconnect (PCI), backplane, system board(s), fan(s), etc.) and registers 320. The logic device 120 is communicatively coupled to the plurality of system components 310, and configured to receive status signals from each of the plurality of system components 310. The status signals may comprise status information, error information, and/or presence information. For example, in the case of a power supply, the status signal from the power supply may be a DC_OK signal indicating whether or not a direct current (DC) level is proper. Alternatively or in addition, the status signal from the power supply may be an AC_OK signal indicating whether or not an alternating current (AC) level is proper. Still further, in the case of a drive, the status signal from the drive may be a presence signal indicating whether or not the drive is present. Furthermore, the status signal may be an error signal indicating that an error occurred.

The logic device 120 is configured to monitor or otherwise determine whether a status of the plurality of system components 310 changes. In response to such a change, the logic device 120 is configured to store information regarding this change in the register(s) 320.

For example, the logic device 120 may continuously/periodically receive the status signal DC_OK from a power supply. The signal may typically be logic level "1" indicating that the DC level is proper. In response to a power event, however, the signal may change to logic level "0" indicating that DC level is improper (e.g., in response to a power event such as a blackout or brownout). The logic device 120 is configured to monitor this signal from the power signal and store information in the register(s) 320 indicating that the status of the power supply, and in particular the DC_OK level, changed. In some implementations, even if the logic level of DC_OK transitions back to logic level "1", the register would nonetheless continue to store the information indicating that the status of DC_OK changed.

As another example, the logic device 120 may continuously/periodically receive the status signal PRESENT from a drive/backplane. The signal may typically be logic level "1" indicating that the drive is present. In response to the drive being drive removed, however, the signal may change to logic level "0" indicating that drive has been removed. The logic device 120 is configured to monitor this signal from the drive/backplane, and store information in the register(s) 320 indicating that the status of the drive changed. In some implementations, even if the drive were promptly put back in place and the logic level shifted back to "1", the register would nevertheless continue to store the information indicating that the drive was removed.

As still a further example, the logic device 120 may continuously/periodically receive the status signal ERROR1 from a host bus adapter (HBA). The signal may typically be logic level "1" indicating no error. In response to an error occurring with respect to the HBA, the signal may change to logic level "0" indicating an error. The logic device 120 is configured to monitor this signal from the HBA, and store information in the register(s) 320 indicating that the error status of the HBA changed.

The controller 140 is communicatively coupled to the logic device 120. The controller 140 may be configured to detect a system error and, in response to the system error, to rapidly acquire the information from the register(s) 320 indicating whether or not the status of at least one of the plurality of system components 310 changed. More precisely, the controller 140 may communicate and/or have heartbeat signaling with system components such as the central processing unit (CPU). In response to a determination that a fatal system error has occurred, the controller 140 may immediately acquire the current status information stored in the register 320 within the logic device 120. The controller 140 may then store the acquired status information in the memory 150 (e.g., a nonvolatile memory). The process of acquiring the data from the register 320 and storing the data in memory may occur, e.g., in under 2 mS, because the system is crashing and the data must be acquired and stored in a rapid manner.

It should be noted that only a few system components are shown in FIG. 3 for the purpose of illustrations. In an actual system, there may be hundreds of system components each providing status signals to the logic device 120. It should be further noted that, in some embodiments, each of the system components is a hardware component of the system 300.

Figure 4:
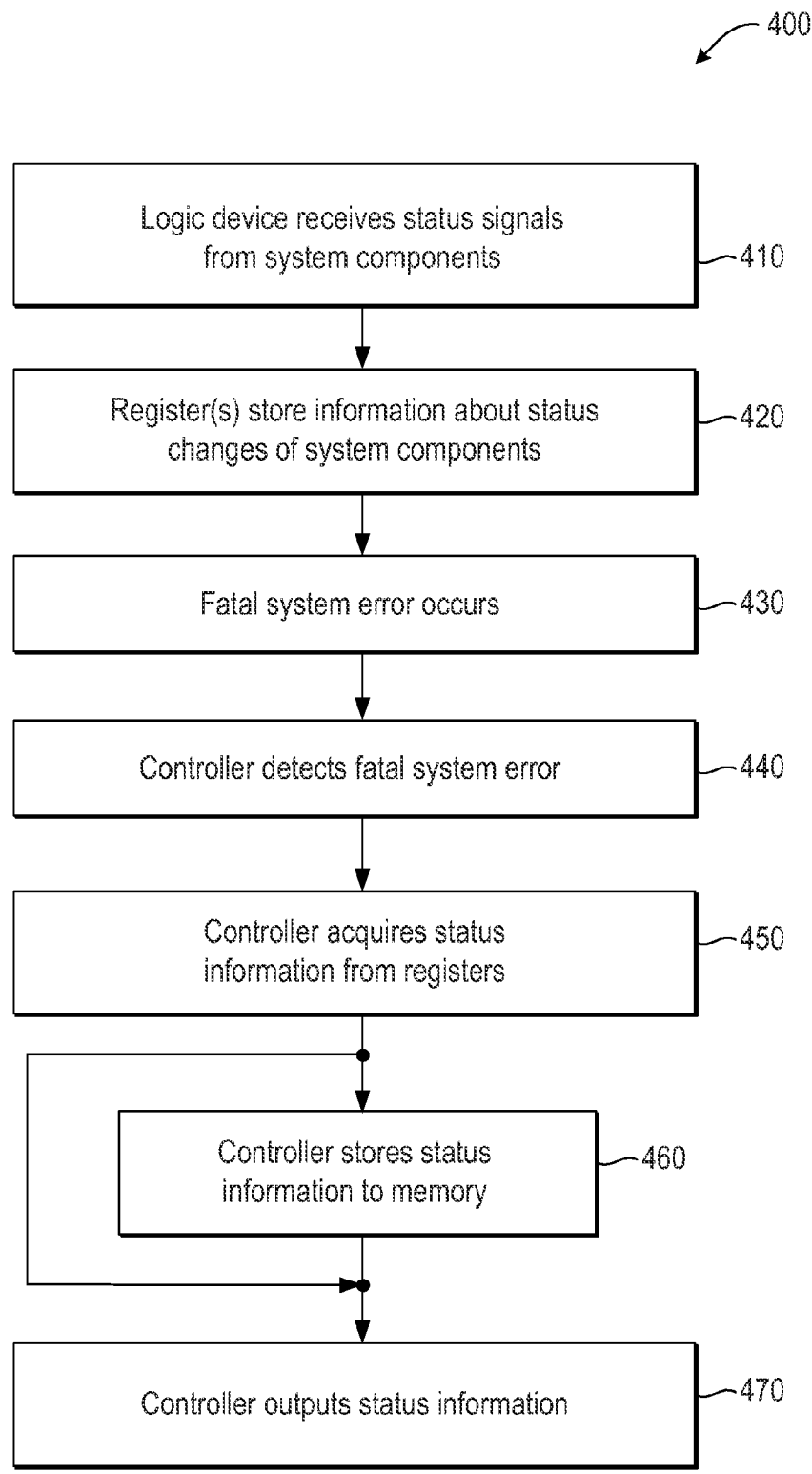
FIG. 4 depicts a process flow diagram in accordance with another embodiment.

FIG. 4 depicts a process flow diagram 400 in accordance with an embodiment. As mentioned above, it should be readily apparent that the processes depicted in FIG. 4 represent generalized illustrations, and that other processes may be added or existing processes may be removed, modified, or rearranged without departing from the scope and spirit of the present disclosure. Further, as mentioned above, it should be understood that the processes may represent executable instructions that cause the logic device 120 and/or controller 140 to respond, to perform actions, to change states, and/or to make decisions.

The process may begin at block 410, where the logic device 120 receives one or more status signals from each of the plurality of system components 310. As mentioned above, the one or more status signals may comprise status information, error information, and/or presence information. At block 420, the registers 320 store information about status changes of the one or more system components 310. For example, and as mentioned above, if a DC_OK status signal from a power supply changes levels, the register(s) 320 will record information about this event. Similarly, if a PRESENT signal from a hard drive changes levels, the register(s) 320 will record information about this event. Still further, if an ERROR1 signal from a HBA changes level, the register(s) 320 will record information about this event. Thereafter, in response to a fatal system error occurring at block 430, and the fatal system error being detected by the controller 140 at block 440, the controller 140 acquires the status information from the register(s) 320 at block 450. The controller 140 may then, at block 460, store the system console output data to memory 150 and/or at block 470 output the system console output data. The controller 140 may output the system console output data to, for example, other components in the system 300, or to other components or devices attached to the system 300. In some embodiments, the controller may output the system console output data to other controllers (e.g., other board management controllers in a cluster). In other embodiments, the controller 140 simply stores the system console output data to memory and does not proceed to output the data.

Figure 5:
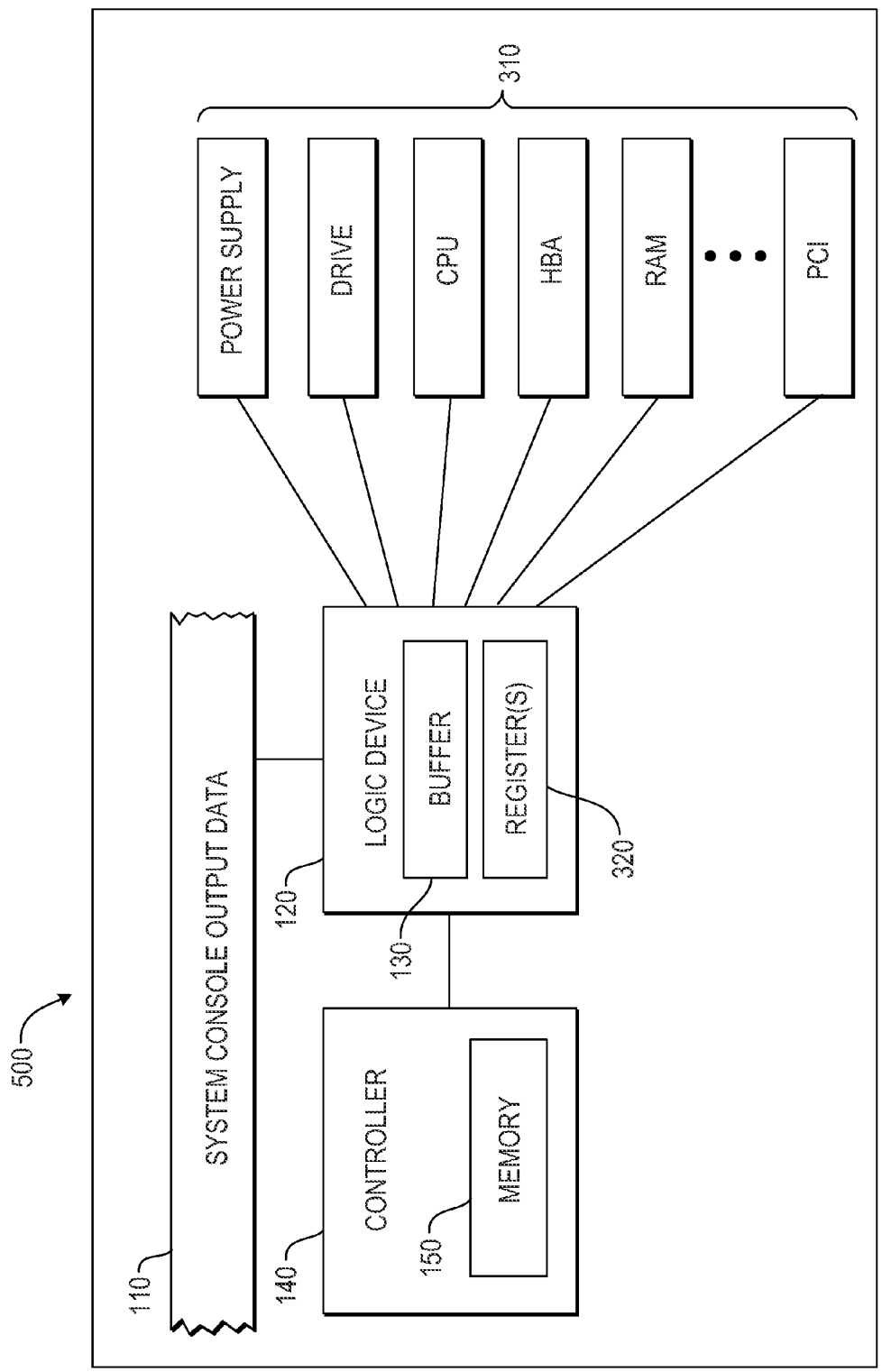
FIG. 5 depicts a system in accordance with a further embodiment.

FIG. 5 depicts a system 500 in accordance with another embodiment. It should be readily apparent that the system 500 depicted in FIG. 5 represents a generalized illustration and that other elements may be added or existing elements may be removed, modified, or rearranged without departing from the scope of the present disclosure.

The system 500 comprises a bus 110, a logic device 120, a buffer 130, register(s) 320, a controller 140, a memory 150, and system components 310, each of which are similar to those described above with respect to FIGS. 1 and 3. The system 500 combines the functionality of the systems described with respect to FIGS. 1 and 3. In particular, the bus 110 is configured to propagate at least system console output data. Such system console output data may include system administration data from, e.g., the BIOS, the boot loader, the kernel, the drivers, the firmware, the initialization system, and/or the system logger. The logic device 120 is coupled to the bus 110 and configured to monitor or "snoop" the data propagating on the bus 110 to collect system console output data passing on the bus 110 and to store this data in the buffer 130. Furthermore, the logic device 120 is communicatively coupled to the plurality of system components 310, and configured to receive status signals from each of the plurality of system components 310. The status signals may comprise information such as status information, error information, and/or presence information. The logic device 120 is further configured to monitor or otherwise determine whether a status of the plurality of system components 310 changes. In response to such a change, the logic device 120 is configured to store information regarding this change in the registers 320.

The controller 140 may be configured to detect a system error, and, in response to the system error, to rapidly acquire the data stored in the buffer 130 and the register(s) 320. More precisely, the controller 140 may receive interrupts and/or have signaling with system components such as the central processing unit (CPU) in order to determine when non-fatal and/or fatal system errors occur. In response to a determination that a fatal system error has occurred, the controller 140 may acquire the current system console output data stored in the buffer 130 as well as the information indicating whether the status of at least one of the plurality of system components 310 changed from the register(s) 320. The controller 140 may then store the acquired system console output data in the memory 150. The process of acquiring the data from the buffer 130 and register 320 and storing the data in memory may occur, e.g., in under 2 mS because the system is crashing and the data must be acquired and stored in a rapid manner. The memory 150 may be a non-volatile memory (e.g., ROM, flash memory, NVRAM, magnetic storage, MRAM, EEPROM, etc.), so that the data is not lost upon the system shutting down and is available for post-failure analysis. It should be noted that while the memory 150 is depicted in FIG. 5 as being integrated with the controller 140, in some embodiments, the memory 150 may be a discrete component external to the controller 140.

Figure 6:
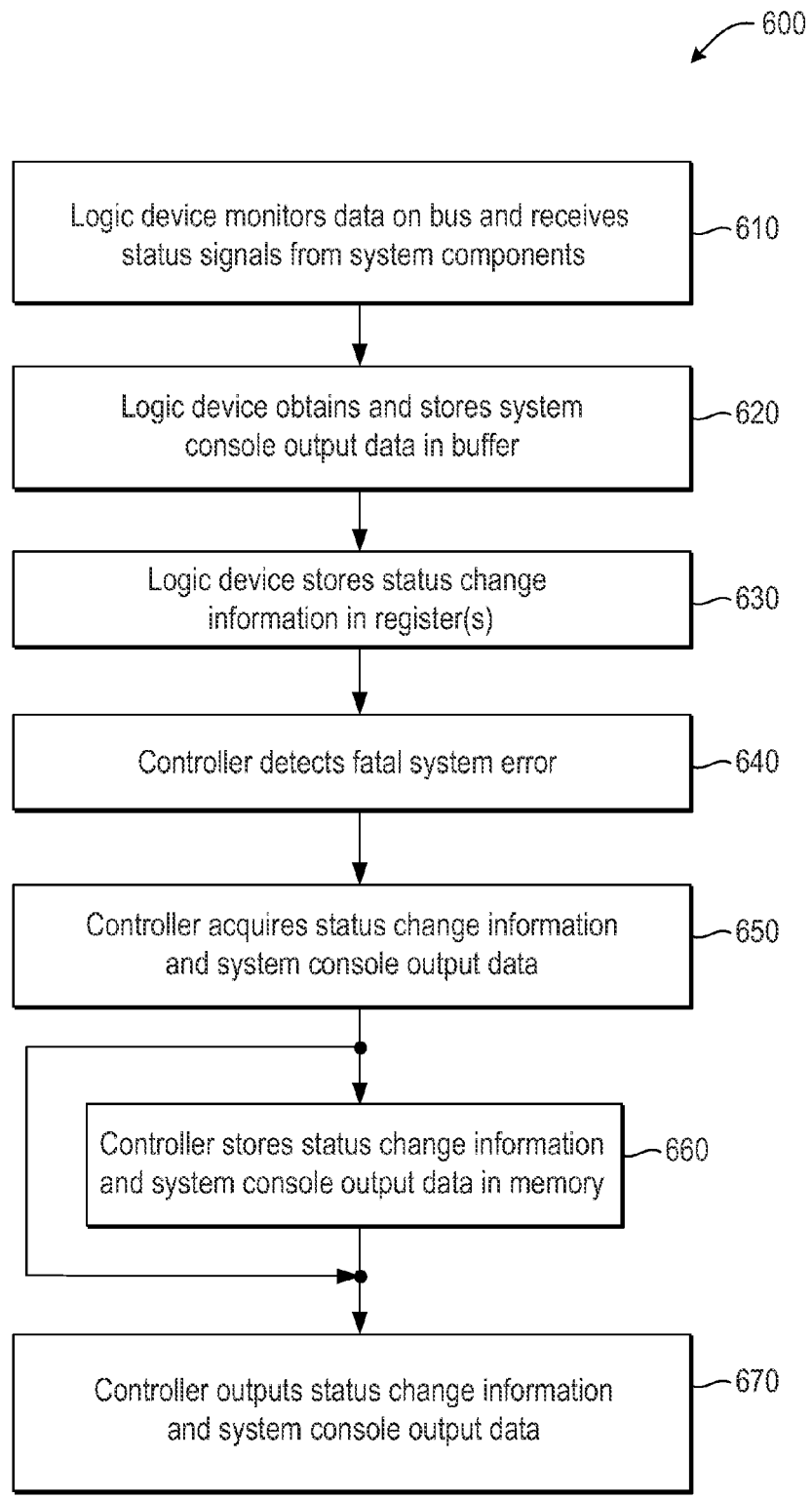
FIG. 6 depicts a process flow diagram in accordance with a further embodiment.

FIG. 6 depicts a process flow diagram 600 in accordance with an embodiment. As mentioned above, it should be readily apparent that the processes depicted in FIG. 6 represent generalized illustrations, and that other processes may be added or existing processes may be removed, modified, or rearranged without departing from the scope and spirit of the present disclosure. Further, as mentioned above, it should be understood that the processes may represent executable instructions that cause the logic device 120 and/or controller 140 to respond, to perform actions, to change states, and/or to make decisions.

The process may begin at block 610, where the logic device 120 monitors data on the bus 110, and receives status signals from each of the plurality of system components 310. At block 620, the logic device 120 obtains and stores system console output data in the buffer 130. Prior to, concurrently, or subsequently, at block 630, the logic device 120 stores status changes in the registers 320. Thereafter, in response to a fatal system error occurring and this error being detected by the controller 140 at block 640, the controller 140 acquires the system console output data currently stored in the buffer 130 and acquires the status information from the registers 320 at block 650. The controller 140 may then, at block 660, store the system console output data and the status information to memory 150 and/or at block 670 output the system console output data. The controller 140 may output the system console output data and status information to, for example, other components in the system 500, or to other components or devices attached to the system 500.

The present disclosure has been shown and described with reference to the foregoing exemplary embodiments. It is to be understood, however, that other forms, details, and embodiments may be made without departing from the spirit and scope of the disclosure that is defined in the following claims.

What is claimed is:

1. A system comprising:
   a bus to propagate data comprising at least system console output data;
   a logic device to monitor the data on the bus and to store the system console output data in a buffer;
   a controller to detect a system error and, in response to the system error, to acquire at least a portion of the system console output data from the buffer; and
   a non-volatile memory to store the portion of the system console output data acquired by the controller.

2. The system of claim 1, wherein the system error is a fatal system error that will render the system inoperable for a period of time.

3. The system of claim 1, wherein the buffer is configured to store the most recent system console output data in a rotating log.

4. The system of claim 1, further comprising a communication interface to output the portion of the system console output data acquired by the controller.

5. The system of claim 1, wherein the logic device is configured to identify the data on the bus that has an address matching a console output address.

6. The system of claim 1, wherein the controller is a board management controller.

7. A system comprising:
   a bus to propagate data comprising at least system console output data;
   a logic device to: (1) monitor the data on the bus; (2) store the system output console data in a buffer; and (3) receive a status signal from a plurality of system components;
   a register to store information indicating whether a status of at least one of the plurality of system components changed;
   a controller to detect a system error and, in response to the system error, to acquire from (1) the register the information indicating whether the status of at least on of the plurality of system components changed, and (2) the buffer at least a portion of the system console output data; and
   a non-volatile memory to store the information indicating whether the status of at least one of the plurality of system components changed and the portion of the system console output data.

8. The system of claim 7, wherein the status signal indicates if an error occurred.

9. The system of claim 7, wherein the status signal indicates the presence of a component.

10. The system of claim 7, wherein the controller is a board management controller.

11. The system of claim 7, wherein the system error is a fatal system error.

12. The system of claim 7, further comprising a communication interface configured to output the information indicating whether the status of at least one of the plurality of system components changed.

13. A system comprising:
   a logic device configured to monitor data on a bus and store system console output data in a buffer, and to receive a status signal from a plurality of system components and store information indicating whether a status of at least one of the plurality of system components changed in a register; and
   a controller configured to detect a system error and, in response to the system error, acquire at least a portion of the system console output data from the buffer, and to acquire the information indicating whether the status of at least one of the plurality of system components changed from the register.

14. The system of claim 13, further comprising:
a non-volatile memory configured to store the portion of the system console output data, and to store the information indicating whether the status of at least one of the plurality of system components changed.

15. The system of claim 13, wherein the status signal indicates if an error occurred.

16. The system of claim 13, wherein the status signal indicates the presence of a component.

17. The system of claim 13, wherein the buffer is configured to store the most recent system console output data in a rotating log.

18. The system of claim 13, wherein the controller is a board management controller.

19. The system of claim 13, wherein the logic device is a programmable logic device.

20. The system of claim 13, wherein the system comprises a storage device, a server, or a switch.

* * * * *

UNITED STATES PATENT AND TRADEMARK OFFICE
CERTIFICATE OF CORRECTION

PATENT NO. : 8,793,538 B2
APPLICATION NO. : 13/361102
DATED : July 29, 2014
INVENTOR(S) : Sahba Etaati It is certified that error appears in the above-identified patent and that said Letters Patent is hereby corrected as shown below:

In the Claims

Column 8, line 34, in Claim 7, delete "the register" and insert -- register --, therefor.

Column 8, line 35, in Claim 7, delete "on" and insert -- one --, therefor.

Signed and Sealed this
Ninth Day of December, 2014

Michelle K. Lee
*Deputy Director of the United States Patent and Trademark Office*